United States Patent [19]

Schneider et al.

[11] Patent Number: 4,931,245
[45] Date of Patent: Jun. 5, 1990

[54] PROCESS FOR THE PRODUCTION OF A CONTAINER OR TUBE FITTED WITH A PUMP

[75] Inventors: Bernard Schneider, Sainte Menehould; Gérard Chapet, Paris, both of France

[73] Assignee: Cebal, Clichy, France

[21] Appl. No.: 347,039

[22] Filed: May 4, 1989

[30] Foreign Application Priority Data

May 6, 1988 [FR] France .................... 88 06603

[51] Int. Cl.⁵ .................. B29C 45/14; B29C 65/78
[52] U.S. Cl. .................................. 264/161; 264/267; 264/274; 264/277; 264/278; 264/318; 264/DIG. 41
[58] Field of Search ............. 264/267, 277, 278, 318, 264/274, 513, DIG. 41, 161

[56] References Cited

U.S. PATENT DOCUMENTS

| | | | |
|---|---|---|---|
| 3,278,086 | 10/1966 | Clouzeau et al. | 264/274 |
| 3,988,413 | 10/1976 | Gaudet et al. | 264/259 |
| 4,021,524 | 5/1977 | Grimsley | 264/267 |

FOREIGN PATENT DOCUMENTS

| | | |
|---|---|---|
| 0109657 | 5/1984 | European Pat. Off. . |
| 0251863 | 1/1988 | European Pat. Off. . |
| 382222 | 1/1987 | Fed. Rep. of Germany . |

*Primary Examiner*—James Lowe
*Attorney, Agent, or Firm*—Dennison, Meserole, Pollack & Scheiner

[57] ABSTRACT

The invention concerns a process for the production of a container (46) or tube (45) fitted with a pump (1) for the distribution of a liquid or creamy product, said pump (1) bearing an annular fixing rim (2), the periphery of which is of plastics material at least at its surface wherein: (a) the pump (1) is disposed between tools which sealingly clamp the rim (2) and contain the pump (1) with clearances limiting the rise in temperature thereof in the moulding operation; (b) the body or the skirt (19) is disposed around a tool, the upper end thereof projecting beyond same; (c) the assembly of tools is disposed in such a way as to form an annular moulding space which is fed by way of a plurality of injection ducts and connects said annular rim (2) to the projecting end of said body or skirt (19); and (d) molten plastics material is injected into said annular moulding space by way of said ducts, the assembly is left to cool and the resulting tube (25) is removed from the mould. The invention also concerns the assembly of die tools used and the resulting container or tube (45), the corresponding pump (1) preferably being a pump without air return. Such containers or tubes (45) are used in the fields of cosmetology, pharmacy, hygiene and foodstuff products.

15 Claims, 3 Drawing Sheets

PROCESS FOR THE PRODUCTION OF A CONTAINER OR TUBE FITTED WITH A PUMP

The invention concerns a process for the production of a container or tube, the body or the skirt of which is of plastics material or 'metalloplastic material', which herein means having at least surface layers of plastics material and an intermediate metal layer, and which is fitted with a pump for distribution of the liquid or creamy product which the container will contain. The invention also concerns the tools used in that process and some of the containers or tubes produced. A 'tube' is in this specification the blank for a container, as is supplied to the party packaging the liquid or creamy product and who, after the tube has been filled with said product, sealingly closes the lower end of the body or skirt, the tube then becoming a 'container'.

European Patent application No. 0,251,863 discloses a metering device which on its pump body comprises a flange which is fitted on to a flexible tube by being moulded thereon. In accordance with that document: 'the moulded connection is formed with a shoulder portion which is moulded in one piece with the tube'. The corresponding Figure shows that the shoulder portion which is disposed at the upper end of the tube envelopes the edge of the flange of the metering device, and there is no other information regarding the moulding operation. The moulded connection which is defined in that way is fragile at the location of the junction between the shoulder portion and the flexible tube and suffers from the risk of tearing and leakage, due to the way in which the tube is held by the person using same and the flattening of the tube at the end of the period of use thereof.

The applicants sought to develop a container or tube which is thus fitted with a distribution pump and which overcomes the foregoing disadvantages.

STATEMENT OF THE INVENTION

In a first aspect the invention concerns a process for the production of a tube fitted with a pump for the distribution typically of a liquid or creamy product, said pump bearing an annular fixing rim, the periphery of which is at least at the surface of plastics material, in which:

(a) said pump is disposed between tools which sealingly clamp said rim and contain the pump with clearances permitting heating thereof during the moulding operation to be limited;

(b) the body or skirt blank is disposed around a lower tool, the upper end of said body or skirt projecting beyond said lower tool;

(c) the assembly of the tools is disposed, the tools defining an annular space which contains the end of said annular rim and the upper end of said body or said skirt and defining or comprising a plurality of injection ducts which open into said annular space; and (d) molten plastics material is simultaneously injected into said annular space by way of said ducts, the plastics material is allowed to cool and the resulting tube is removed from the mould. The above-mentioned cooling time is typically longer than the injection period.

The penetration of air into the container during use thereof is then slight or zero, giving rise to much better preservation of products which are sensitive to the air. The pump used is preferably without an air return, that is to say without a communication between the exterior and the interior of the container during use thereof, as is known from EP-A-0 143 183 and EP-A-0 251 863.

In the foregoing process the annular space between the tools and the feed thereof by way of at least two injection ducts permit the formation of a reproducible, complete, sealing, moulded annular connection between the annular rim of the pump and the body or skirt of the tube. The difficult problem of preserving the pump and the mechanism thereof is resolved by effectively limiting the heating effect thereon during the moulding operation.

The annular space which is used for the moulding operation is relatively wide, of a width which is typically between 1 and 2 mm over the major part of its height, to permit good filling thereof with the molten plastics material, and the resulting semi-rigid annular ring protects the connection thereof to the annular annular rim of the pump from the forces acting thereon due to the tube being held and due to the tube being squashed at the end of use thereof. That connection is in the form of a shoulder portion on the inside of said annular ring which embraces the periphery of said rim. The term 'semi-rigid' means that, when the container or tube is held by means of the annular ring, that causes no substantial deformation of the ring or only slight deformation thereof, contrary to what happens when a flexible tube is held by means of its skirt.

BEST MODE OF CARRYING OUT THE INVENTION

In accordance with this best mode which results from tests performed, the following steps are carried out:

($a_1$) moulding tools having the following particularities are provided or prepared:

the lower central tool and the central die bottom tool comprise central cavities which face each other and in which the pump is disposed, with clearances limiting heating thereof by the moulding operation, the annular fixing rim thereof being sealingly gripped between said tools in the injection position;

the tools after closure define an annular moulding space corresponding to the annular ring to be produced, said space being comprised between on the one hand the central die bottom tool, the end of the annular fixing rim of the pump and the lower tools provided with the body or the skirt, and on the other hand the die tools other than the central die bottom tool;

($a'_1$) the die bottom or die tools comprising at least two ducts for injection of the molten plastics material each open into said annular space by way of an orifice corresponding to a duct of a diameter of 0.7 to 1.4 mm or a cross-section of the same area;

($a_2$) the body or the skirt of the tube is or has been set in place around said lower tools so that it projects beyond same by a selected height, (b) the pump is or has been disposed in the hollow cavity of said central lower tool;

(c) the die tools and the lower tools are assembled, forming said annular space, the die comprising a surface into which the projecting end of the body or the skirt is fitted and the assembly of the tools is closed so as to provide a sealing effect in relation to the annular rim of the pump;

($d_1$) molten plastics material is injected simultaneously by way of the upper orifices of said injection ducts over a period of between 1.5 and 5 seconds;

($d_2$) the assembly is allowed to cool for a time which is at least equal to three times the injection time;

($d_3$) the moulded article is removed by relative displacement of the tools, the plastics material of the injection ducts or 'sprues' being extracted from the die and/or die bottom tools, and the tube is extracted; and ($d_4$) the 'sprues' are then cut off, usually by a mechanical procedure or by ultrasound.

Conditions ($a'_1$) and (c) as well as steps ($d_1$) to ($d_4$) and the succession thereof constitute preferred means which can be used independently of each other or in any combination in the general process. In accordance with a preferred arrangement for facility of positioning of the pump and for limiting the increase in temperature thereof during the moulding operation, in particular in respect of the lower part thereof which contains the most delicate parts of its mechanism, the central cavity of the central lower tool which is typically a "valve" is surmounted by an upper peripheral edge. The lower part of the pump is correctly accommodated in the central cavity when the annular fixing rim thereof is supported on the upper peripheral edge and said annular rim than projects beyond said annular edge by at least 0.8 mm, the central cavity being provided in its lower part with a diametral clearance of at least 0.2 mm with respect to the pump and comprising below same a portion for centering said pump, having a diametrical clearance of a maximum of 0.2 mm with respect thereto.

The diameter of the body of the pump is usually greater above its annular rim than below same. The peripheral surface with which the central die bottom tool is supported against the annular rim is of a minimum width of 0.8 mm in order not to apply any cutting or notching force to the rim of plastics material, and its maximum width is in practice 1.4 mm so as to allow the upper face of the annular rim to project sufficiently for the purposes of providing solidity of the moulding. For the same purpose the width of the upper peripheral edge of the central lower tool, in its preferred arrangement, is such that the annular fixing rim of the pump projects beyond same by from 1 to 3 mm at the radius, said width itself being preferably at least 1.5 mm.

With regard to the guiding action and limiting the increase in temperature of the pump, the central cavity of the central lower tool preferably has in its upper part a clearance with respect to the pump of at least 0.2 mm in respect of diameter over at least 5 mm in height, and its centering portion is at least 3 mm in height.

Moreover in order further to minimise the internal rise in temperature of the pump, it is desirable for the central die bottom tool to fit over the upper part of the pump with a lateral clearance of at least 0.3 mm in respect of diameter.

Generally speaking the dimensions of the various tools are so adjusted that the clamping thereof prior to injection of the plastics material ensures that the annular rim of the pump is sealingly gripped between the peripheral support edge and surface of the central die bottom tool and the central lower tool.

In accordance with a first preferred embodiment of the process of the invention which is particularly suitable for tube-by-tube moulding, the injection ducts are provided in the central die bottom tool or 'die bottom core' and open towards the top of the annular moulding space, said ducts being inclined with respect to the longitudinal axis of symmetry which is by convention vertical, at an angle which is between 24° and 42°.

Preferably, as regards those injection ducts, the angle of inclination adopted is from 27° to 34° with respect to the vertical axis, which gives the best compromise between ease of injection and ease of removal of the moulded article from the mould. The angles which are greater than 35° mean that it is difficult for the 'sprues' to be removed from the mould. The angles from 24° to 27° result in the die bottom core being of greater height, which however can be avoided or limited by lowering the top of its central cavity in such a way that said top is supported on the discharge tube of the pump, while passing into same. That measure which does not have any serious disadvantage in regard to heating of the pump during the moulding operation makes it possible to restore the core to a lower height and to facilitate the operation of removing the moulded article from the mould. Preferably also, depending on the diameter of the annular moulding space to be supplied with plastics material, it is preferable to have a number of injection ducts which is between 2 and 5, said ducts being of the same diameter which is between 0.8 and 1.3 mm and their upper orifices being grouped but non-secant within a circle which is centered on the axis of a diameter of 7 mm or better 5 mm, facilitating injection of the plastics material into said ducts by means of a single nozzle.

It is often necessary to provide an external rib or a groove in the ring of plastics material of the tube or container of the invention. For that purpose, the arrangement uses at that location openable die tools or 'plate portions' provided with means for moving them apart such as springs.

The operation of removing the tube from the mould ($d_3$) then comprises the following detailed steps:
the lower tools are lowered,
the plate portions open, releasing the groove or the rib,
the die block is disengaged upwardly, the sprues being removed from the mould and the lower tools moving away from each other,
the tube is released from the lower tools by injecting air between the punch and the central lower tool, and said tube is extracted upwardly.

The 'sprues' are then removed typically by a mechanical means or by ultrasound.

In accordance with a second preferred embodiment of the process of the invention which is suited to the series production of more substantial components, the central die bottom tool projects beyond the annular space and the injection ducts which pass through it are vertical and open at the upper end of said annular space, providing that removal from the mould of the sprues is even easier than in the first embodiment. The numbers of ducts and the diameters thereof are substantially the same as in the first embodiment. The feed of molten plastics material to the injection ducts is effected from a distributor having spaced injection nozzles.

In a second aspect the invention concerns the assembly of moulding tools used, as set forth in the description of the process and as will be illustrated in the examples.

In a third aspect the invention concerns the container or tube produced by the process constituting the first aspect thereof. The container or tube is distinguished from that known from EP-A-0 251 863 in that the annular fixing rim of the pump, the periphery of which rim is of plastics material at least at the surface, at the location of its moulded juction, is connected to the body or to the skirt of the tube by way of a semi-rigid annular ring of plastics material of the same nature as the surface layers at least of said body or said skirt, the periphery of said rim being engaged in said ring.

Preferably, to provide for good mechanical strength and a good sealing effect in use of the container, the connection between the annular ring and the annular rim of the pump is in the form of an internal shoulder portion on said ring which embraces the periphery of said rim over a width of at least 0.8 mm, while the connecting portion of said ring is of a thickness which continuously decreases from the annular ring to said body or said skirt without any local increase in thickness such as a shoulder portion. The lower end of the annular ring is thus moulded over the upper end of the body or the skirt in the same way as a conventional tube head. A substantial portion of the periphery of the annular rim of the pump is contained in the internal shoulder portion of the moulded annular ring which is typically from 1 to 3 mm in width.

The plastics material of the upper moulded ring is of the same nature as the plastics material of the body or the skirt or its internal surface layer if it is a metalloplastic skirt. When the plastics material of the annular fixing rim of the pump which often constitutes a portion of the casing of the pump is different from the plastics material of the upper connecting ring and the body or the skirt, it is found that the connection between the annular fixing rim and the plastics material of the upper ring is a bonding with intimate adhesion, without re-fusion, and it has been verified that a good seal is then obtained. In order to enhance the mechanical strength of that fixing and the degree of security of the sealing effect, it is then desirable to provide the annular rim in the portion thereof which is contained in the moulding with at least one circular groove or rib, for example a rib measuring 0.4×0.4 mm, being centered on its end edge, or a rib measuring 0.4×0.4 mm, which is disposed on the upper face of said rim at 0.8 mm from the end edge in the case where a portion of the annular rim measuring 1.5 mm in width is contained in the moulding.

In the case where the plastics materials of the annular fixing rim of the pump, the body or the skirt or at least one of the surface layers thereof and the upper ring are of the same nature, the connection between the moulded upper ring and the annular edge of the pump is a weld. That connection cannot be distinguished by optical micrographic section and the width of the annular rim which is involved in the weld can be precisely determined only by virtue of knowing the type of pump used. That connection provides an excellent seal. When the plastics material of the homogeneous connection is polyethylene, it is preferable to use low density PE for the skirt of a flexible tube which is to be squashed as the container is emptied, and high-density PE for the upper ring of the tube which is then to be mechanically strong in the manner of a container neck.

The moulded upper ring is usually extended upwardly by an axial ring acting as a means for protecting the pump body and the push member which is fixed on its discharge tube and carries a means for lateral delivery of the packaged product. Thus the push member, in the upward position, can be partly masked by the protective ring and can move downwardly within the ring which then ensures that it is properly guided when it is depressed.

The sealing connection which is thus formed between the tube or container and the pump permits the packaging operation to be simplified, the only sealed closure which has to be made after the tube or container has been filled with the product being that at the free end of the body or skirt. It is then possible to provide that the residual volumes of air after closure are less than 1 cm$^3$ and much less if the skirt or body is closed in a flow of neutral gas, which is a particularly attractive proposition in regard to delicate products and the preservation thereof.

The guarantee which is afforded in respect of sealing of the arrangement in the head part is of major importance when using a pump without air return, the moulded connection being tamper-proof. That design may then involve either a flexible tube in which the skirt will have the end thereof sealed after the tube has been filled with the product, or a tube with a semi-rigid body which is typically between 0.8 and 1.2 mm in thickness, preferably being fitted with a piston which is slidable sealingly within said body.

Advantageously, when the piston comprises an upper flexible flared lip which provides the sealing action, the bottom of the body comprises a means for escape of the air upon insertion of the piston into the body, consisting of an internal raised portion which is transverse, that is to say substantially perpendicular to the longitudinal axis of said body, the raised portion being of a minimum inside diameter which is 0.4 to 1.2 mm smaller than the inside diameter of said body, and being preceded by a flared entry zone which permits free engagement of the upper flared lip of the piston and then progressive contraction thereof, the central recessed portion of the piston being of smaller diameter than said internal raised portion so as not to interfere with the forward movement of the piston. Tests have shown that, upon insertion of the piston into the body of the container, the upper lip which is contracted in that way had small undulations or wrinkles and that it retained them until the piston stopped in contact with or in the vicinity of the product contained in the tube, which permits the trapped air to escape between the small undulations and the cylindrical inside surface of the body. Consequently there is no return movement of the piston after it has stopped, due to resilient compression of the occluded air, nor is there any bubbling effect upon distribution of the product by means of the pump.

The piston usually comprises on its rear a lower semi-rigid end which serves to guide it within the body. It is then desirable to have in the transverse raised portion one or more interruptions of a unitary length which is typically between 0.5 and 3 mm so as not to interfere excessively with the contraction of the lip and to assist with discharge of the air at the moment at which the lower end passes across the transverse raised portion. The flared entry zone of the transverse internal raised portion is preferably substantially frustoconical with a cone half-angle of from 10° to 25°, and with the same axis of symmetry as the body. The transverse raised portion and the entry and progressive contraction zone thereof are typically formed either by thermoforming of the body or by the addition of a separate base portion which is fitted into the bottom of the body.

ADVANTAGES OF THE INVENTION

They are as follows:
the result obtained is a tube which is already fitted with a pump, with tamper-proof sealing fixing thereof;
the moulding process of the invention is applied both to heterogeneous connections and to homogeneous connections in respect of the fixing rim of the pump and a body or a skirt of a tube, the rim and the body or skirt typically both being of polyolefins, either of the same nature or different;

the operations involved in packaging of the product in the tube are simplified;

in particular the operations for closure of containers without residual air or with very little residual air, which are important when using pumps without air return, are facilitated; and the process, by virtue of the elimination of the components used in mechanical fixing of the pump, which is classically effected by a clamping operation, permits substantial savings to be made.

(1) FIRST EMBODIMENT OF THE INVENTION

Figure 1:
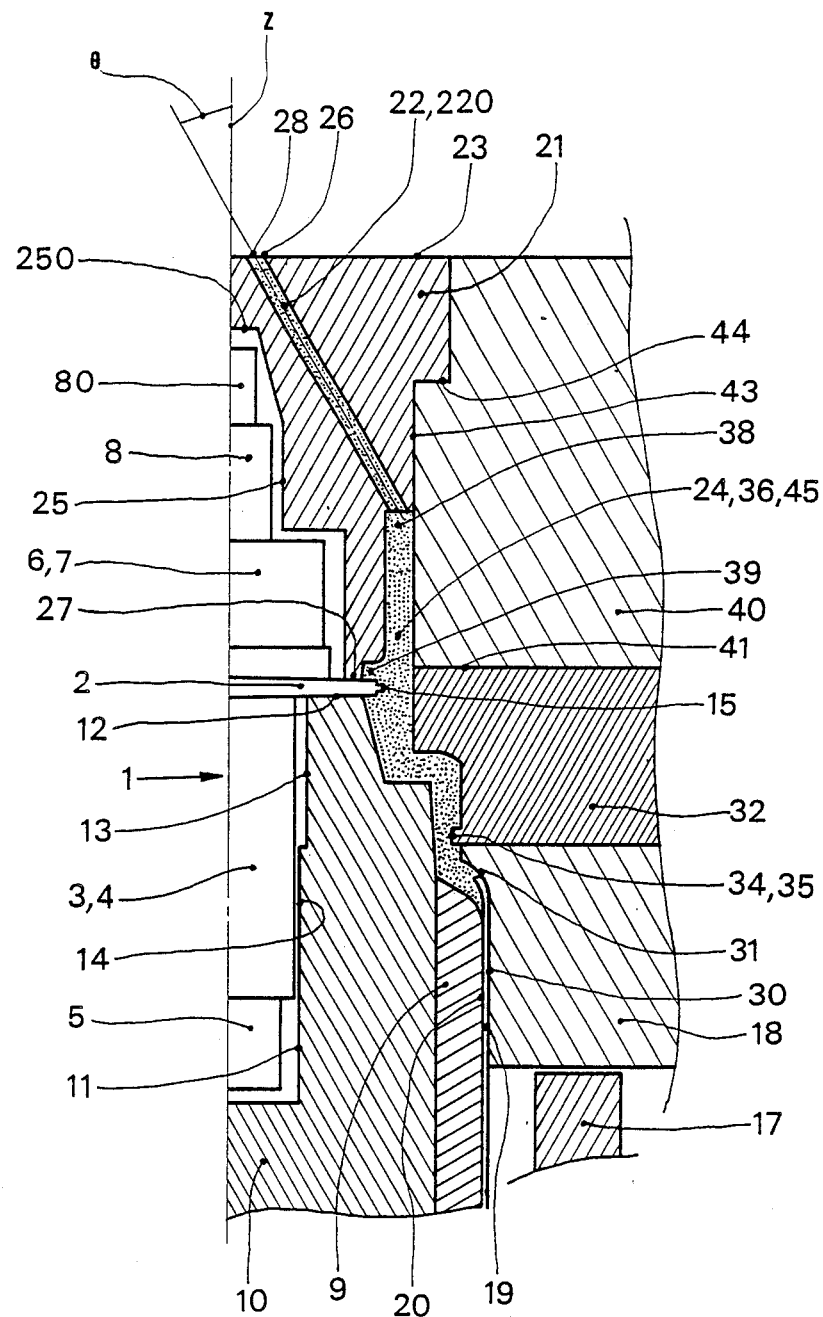
FIG. 1 is a view in axial section of half a tube according to the invention in the moulding position, in accordance with the first embodiment of the invention.

The pump 1 shown in FIG. 1 is without an air return of the type VP7 from Etablissements VALOIS (FR), it is covered with polypropylene and its annular fixing rim 2 which is disposed substantially at a half-way position in respect of the height of its body is of an outside diameter of 17.5 mm and a thickness of 1 mm, with a peripheral rib 15 of a cross-section measuring 0.4×0.4 mm at a half-way position in respect of the thickness of its end edge. Its lower part 3 which contains the mechanism of the pump comprises, below the annular rim 2, a portion 4 which is 17 mm in height and 8 mm in diameter, and a tube portion 5 for the intake of product, which is 5 mm in height and 5.5 mm in diameter.

It is necessary to avoid heating the portion 4 above a temperature of 70° C. and if possible a temperature of 50° C. should not be exceeded. The upper part 6 which contains the top of the mechanism and a hollow stem or product ejection and actuating discharge stem successively comprises a portion 7 which is 8 mm in height and 11 to 11.5 mm in diameter, a narrower portion 8 which is 6 mm in height and 5 mm in diameter and the discharge stem 80 which is 3 mm in diameter and which projects by 5 mm beyond the portion 8 when it is not actuated or has no force bearing thereon.

The lower tools comprise an annular punch 9 and a central tool 10 referred to as a "valve", which is engaged in the punch 9. The central tool or valve 10 comprises a central cavity 11 surmounted by an upper peripheral edge 12; accommodated in the cavity 11 is the lower part 3 of the pump 1 when its annular fixing rim 2 is supported on the upper peripheral edge 12.

The annular rim 2 projects beyond the upper peripheral edge 12 by a width of from 3.15 mm to 1.2 mm. In its upper part 13 the central cavity 11 is 8.8 mm in diameter over a height of 8.5 mm and below same it is of a diameter of 8.1 mm to the bottom thereof, corresponding to a total depth of 23 mm. Therefore, in the upper part 3 there is a clearance of 0.4 mm in diameter with respect to the portion 4 while below, in the centering portion 14, there is a small clearance of 0.1 mm in respect of diameter in relation to the bottom of the portion 4 of the pump, which then involves a height of 8.5 mm, providing a very good centering effect. The 'valve' 10 is in this case engaged into the punch 9 and a cylindrical portion, said two tools 9 and 10 being fixed on a sleeve (not shown), the rigid edge 17 of which is supported beneath the die 18 for clamping of the tools prior to the moulding operation. Injections of compressed air between the valve 10 and the punch 9 permit ejection of the component. A skirt portion 19 of low-density polyethylene, which is 30 mm in outside diameter, 0.5 mm in thickness and 80 mm in length or height, has been fitted around the outside vertical surface 20 of the punch 9 and, that surface being inclined, projects beyond the punch 9 by a height of 2 mm. The die tools comprise a die bottom core 21 which fits over the upper part 6 of the pump 1 in the moulding position, the core 21 then being sealingly supported on the annular fixing rim 2 of the pump 1.

In the present example the die bottom core 21 comprises three injection ducts 22 which are inclined at 30°30' with respect to the axis Z and which are spaced at 120°, all three ducts being of a diameter of 1.2 mm, with the centres 28 of their upper orifices 26 being disposed on a circle of a diameter of 3 mm, which is centered on the axis Z. The peripheral surface 27 with which the core 21 bears against the annular rim 2, of polypropylene, is 1.1 mm in width and the annular rim 2 projects beyond the surface 27 by 1.2 mm, that is to say the width which is already free over its bottom face. The die bottom core 21 and the valve 10, outside their surfaces 27 and 12 with which they bear against the rim 2, have frustoconical surfaces which are inclined at 15° with respect to the axis, which is favourable in regard to removal of the moulded article from the mould and the mechanical strength of the moulded connection. The central cavity 24 of the die bottom core 21, going from its opening to its end or top 23, comprises a first portion which is 13.5 mm in diameter and 8.5 mm in height, then a second portion which is 6 mm in diameter and 6 mm in height, and then a third frustoconical portion which has an end diameter of 3.65 mm and which is 4.4 mm in height. The lateral clearance of the cavity 24 of the core 21 with respect to the pump therein is 0.75 to 1 mm in diameter for the first portion and 0.5 mm in respect of diameter in the second portion.

In addition to the die bottom core 21 already described above, the die tools comprise the following, in an upward direction:

an annular die 18 comprising a lower vertical surface 30 which is overhung by a curved surface 31 which is of a quarter-round profile in axial section. In the assembled position the skirt portion 19 is disposed between the vertical surfaces 20 and 30 of the valve 10 and the die 18 and its projecting end is pushed against the curved surface 31 and assumes the shape therof;

a set of 3 plate portions or sliders 32 which are provided with return springs for moving them away from each other, comprising at the bottom of their inward surfaces a shoulder or projection 34 of right-angled cross-section, which is intended to form a circular groove 35 in the ring 36 to be moulded (FIG. 2), corresponding to the annular moulding space 24. The plate portions 32 form the variation in diameter of the upper or connecting ring 36 between the part thereof which carries the groove 35 serving for hooking engagement with the cap 37 of the container, and its shoulder portion 39 for connection to the annular rim 2 of the pump 1. The plate portions 32 support the die bottom 40 by way of a horizontal surface 41. It will be noted that such plate portions could also serve for forming an engagement rib, in which case the projection 34 is replaced by a groove;

the die bottom 40 in which the vertical inside surface 43 delimits the protective ring 38 and the horizontal inside edge 44 supports the outside of the die bottom core 21.

The die tools 18 and 32 and 40 and 21 are contained in a die block in which they are cooled as usual by way of the exterior, and by the metal-to-metal contacts in the assembly thereof. That cooling effect is not sufficient in itself to provide for sufficient limitation in the increase in temperature of the pump, that limitation being achieved by virtue of the design configuration of the tools and the clearances which are set in the present invention.

The dimensions of the tools are adjusted in order that clamping thereof, prior to injection of the plastics materials, produces a sealing clamping effect in respect of the annular rim 2 of the pump 1 between the peripheral surface and edge 27 and 12 of the die bottom core 21 and the central lower tool or valve 10. In the present case the clamping effect is produced by the sleeve 17 supporting the tools 9, 10, 18, 32 and 40, and by the plastics material injection nozzle which bears against the upper face 23 of the die bottom core 21.

The tools described are also suitable for the production of tubes upon which smaller pumps are mounted, of the type 'VP3' from Etablissements VALOIS, and they have also been used for that purpose.

MOULDING OF A TUBE AND REMOVAL THEREOF FROM THE MOULD

The tools have been clamped in accordance with the above-described arrangement and they define between them an annular moulding space 24 which is contained between: on the one hand the die bottom core 21, the end of the annular rim 2 of the pump 1 and the valve 10 and the punch 9 as well as the end of the skirt 19 which projects beyond the punch 9, and on the other hand the die bottom 40, the plate portions 32 and the top of the die 18. The annular space 24 is of a geometry which corresponds to the annular ring 39 of plastics material to be produced, it is of a constant width at each level by virtue of the arrangements for centering and fixing the pump 1. That width is 1 mm at the location of the projection 34 on the plate portions 32, corresponding to the thickness at the bottom of the groove 35 to be produced; it is 1.55 mm above the groove 35, 3 mm below and above the fixing rim 2, 1.7 mm at the end of the rim 2, not taking account of the fine peripheral rib 15 thereon, and 1.2 mm for the portion corresponding to the annular protective ring 38 which will surmount the peripheral connecting shoulder portion 39.

Once the assembly has been prepared in that fashion, the nozzle of the injection pot which at its base comprises an injection orifice of a diameter of 5 mm is applied to the upper face 23 of the die bottom core 21, the three orifices 26 of the ducts 22 then being in vertical alignment with the orifice of a diameter of 5 mm, and molten high-density polyethylene was injected, at a temperature of about 260° to 290° C., for a period of 3 seconds. The injection pot and its nozzle were raised, the molten plastics material becoming unstuck perfectly from the face 23 which has remained relatively cold, and the arrangement was then left in the assembled condition for a cooling time of 12 seconds.

The operation of removing the moulded article from the mould was then effected by carrying out the following successive operations:

the lower tools 9 and 10 were lowered, with their sleeve comprising the support edge 17;

the stack of die tools 18, 32, 40 and 21 no longer being clamped together, the plate portions 32 are opened by moving away from the axis Z, thus disengaging the circular groove 35 in the connecting ring 36;

the die block comprising the die tools was raised, the three cold sprues 22 being extracted from the injection ducts 22 and the lower tools moving away to the side; and air was injected between the punch 9 and the central lower tool or valve 10, which caused the tube 45 produced to be released from the tools 9 and 10, and the tube was extracted upwardly.

The sprues 220 fixed to the upper end of the protective ring 38 of the tube 45 were then cut off, taking 0.5 mm off that end.

(2) TUBE AND CONTAINER PRODUCED (FIG. 2)

Figure 2:
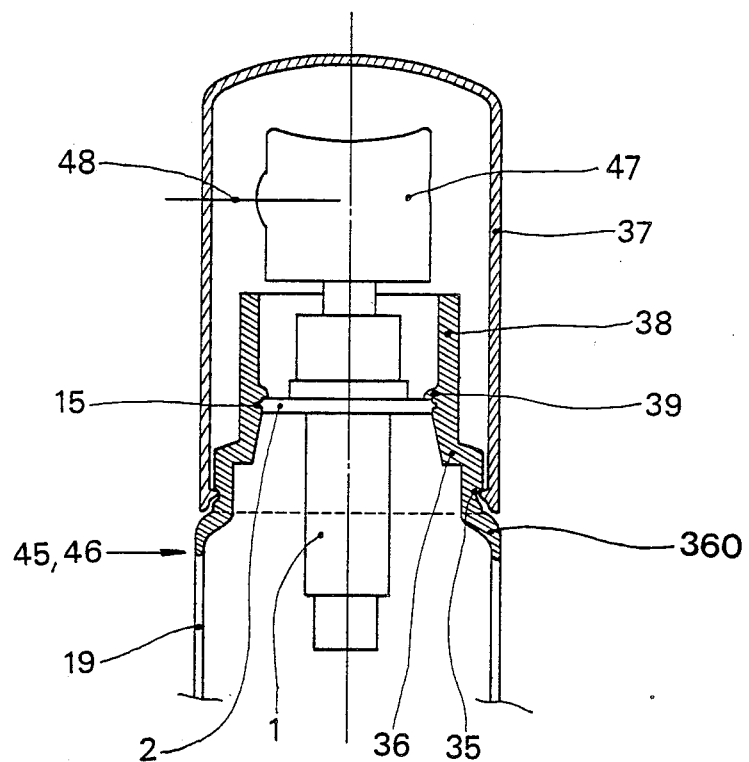
FIG. 2 is a view in axial section showing the head of a container corresponding to the FIG. 1 tube.

The container 46 which is produced by closure of the lower end of the skirt 19 of the tube 45 is shown in FIG. 2, the upper annular connecting ring 36 of the tube 45, which is produced by the above-described moulding operation, alone being shown in section and by hatching. The connection made between the annular edge 2 of polypropylene and the ring 36 of high-density polyethylene is that of a very good adhesive join consolidated by the presence of the peripheral rib 15. The moulded connection between the ring 36 and the skirt 19 of the tube comprises an annular portion 360 of a thickness which continuously decreases to the tube 19, without any local increase in thickness such as a shoulder portion. The protective ring 38 extends sufficiently high for the thrust member 47 which is fixed on the outlet tube of the pump 1 to move within the ring 38 to a position below the lateral spray nozzle whose axis is indicated at 48. The protective cap 37 is fitted by clipping engagement into the annular groove 35 in the tube 45 or container 46. It is also possible to omit the groove 35 and to provide that the cap is fitted on to the ring 36 by being a slight press fit thereon.

(3) TUBES WITH SEMI-RIGID BODIES

The tubes 450 and 451 (FIGS. 3 and 4) are obtained by the same moulding process as the tube 45 and each comprise a pump without air return and a circular cylindrical body 190 with an outside diameter of 36 mm, of polyethylene of a thickness of 1 mm.

Figures 3, 4:
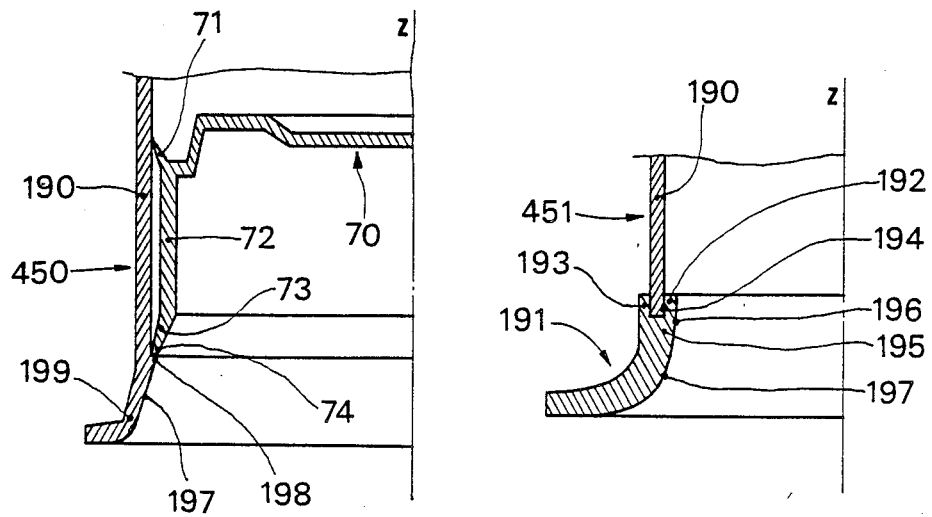
FIG. 3 is a view in axial section of half the bottom of the semi-rigid body of a second tube bearing a transverse internal raised portion and a slidable piston which is engaged in the body.
FIG. 4 is a view in axial section of half of the bottom of the semi-rigid body of a third tube provided with an added base portion.

FIG. 3 shows the tube 450 fitted with a slidable piston 70 which slides sealingly within the body 190 and which thus automatically moves upwardly in the body 190 when liquid or cream is distributed by means of the pump. Below its flexible flared sealing sliding lip 71, the piston 70 comprises a central recessed portion 72 and a lower semi-rigid guiding end 73 with an outside diameter in the rest condition of 34.3 mm. The transverse internal raised portion 198 which is perpendicular to the longitudinal axis of symmetry Z is 33 mm in inside diameter and a frustoconical entry zone 197, with a cone half-angle of 15° and a height of 4 mm in the direction of the axis Z, its engagement diameter 35 mm permitting free engagement of the flexible flared lip 71 of a diameter in the rest condition of 34.5 mm when the piston 70 is inserted into the body 190.

In the tube 451 (FIG. 4), the transverse raised portion 195 and 192 is provided by the addition of a moulded base portion 191 with an enlarged support base configuration, the base portion 191 comprising two circular lips, an internal lip 192 and an external lip 193, each being 0.5 mm in thickness and 4 mm in height, the double lip configuration 192 and 193 embracing the lower end of the body 190. The minimum inside diameter is that of the lip 192, and its inward surface 196 is preceded by a flared entry surface 197. The base portion 191 is fixed to the bottom of the tubular body 190 by glueing.

(4) SECOND EMBODIMENT OF THE PROCESS OF THE INVENTION (FIG. 5)

This embodiment involves two important modifications in comparison with the first embodiment. Firstly the annular ring 361 does not comprise any circular engagement raised portion such as the groove 35 of the first embodiment, it is designed for the fixing of a cap which fits around it with a press fit, and there are therefore no longer any plate portions which can be moved away, such as the plate portions 32 in the first embodiment. The die bottom tool 40 and the die tool 18 of the first embodiment are replaced by a single peripheral tool 401, the total amount of space occupied by the tool being reduced, that being advantageous in regard to an arrangement having a plurality of moulding positions, which is suited for mass production.

The second modification is independent of the first, it relates to the upper central tool or die bottom core which is indicated herein at 211 and which as previously is supported against the tool 401 which surrounds it, but projecting outwardly of the annular space 24 from the upper end of the space 24, the injection of plastics material being effected by way of 3 short vertical injection ducts 221 which open at the upper end of the space 24. The ducts are spaced at 120° and all three are of a diameter of 1.2 mm.

The arrangement of the pump 1 which in this case is of type VP3 from Etablissements VALOIS, with respect to the tools and the clearances thereof with respect to said tools are substantially the same as in the first embodiment except for the peripheral raised portion 15 at the end edge of the annular rim 2 of the first embodiment which in this embodiment is replaced by a peripheral raised portion 151 on the periphery of the upper face of the rim 2, providing for good resistance to disengagement by virtue of a force diametrally applied to the annular ring 361. The materials are the same as in the first embodiment.

Figure 5:
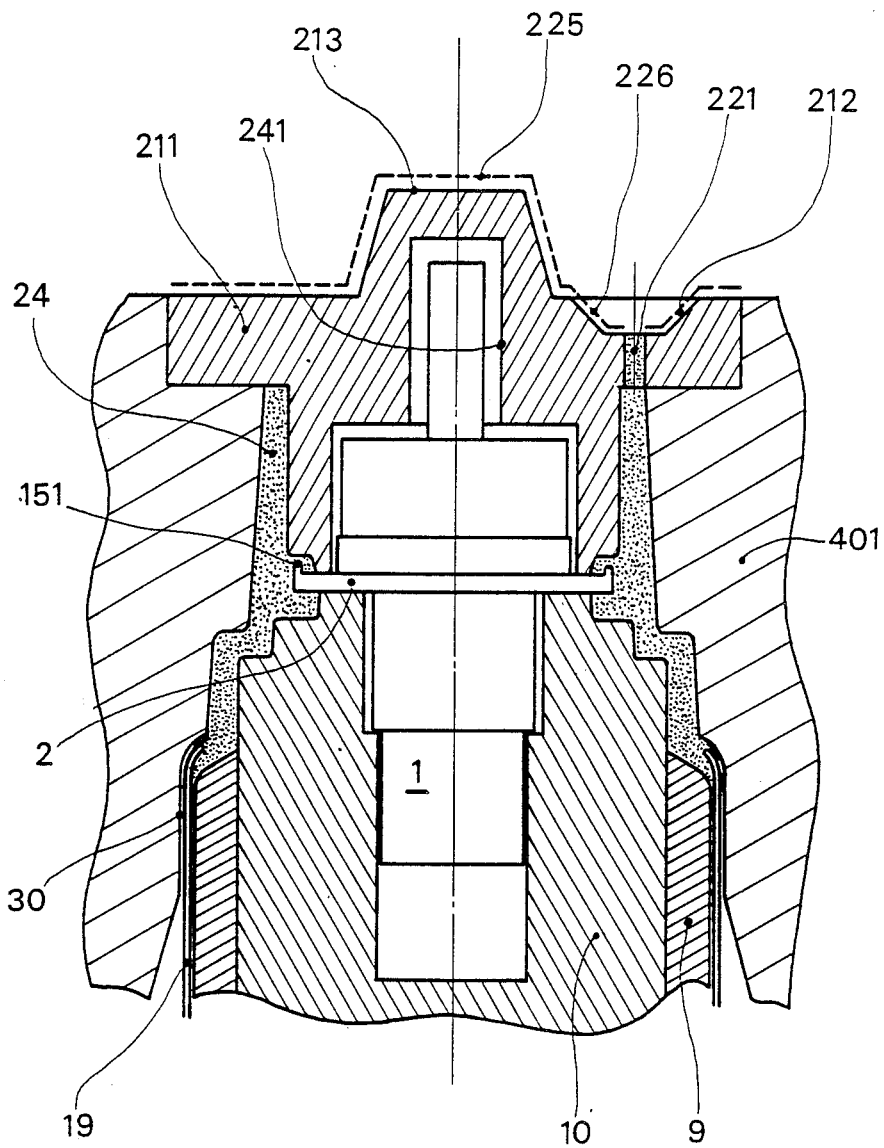
FIG. 5 is a view in axial section of a further embodiment of the invention.

Each injection duct 221 is surmounted by an intake hollow 212 into which an injection nozzle 226 of the distributor pot 225 engages. Centering of the pot 225 for the injection operation is facilited by engagement with a raised portion 213 on the central tool 211, the raised portion 213 being disposed in this embodiment in vertical alignment with the recess 241 which fits over the pump 1 with clearance. The position of the pot 225 at the moment of the injection operation is shown in broken lines in FIG. 5.

The injection ducts 221 being vertical and short, the operation of removing the moulded article from the mould is particularly easy. The ducts 221 are also spaced further away from the housing 241 for the pump 1 than in the first embodiment. The rise in temperature of the pump 1, due to the moulding operation, is even less.

USES

The containers and tubes produced by means of the invention are used in the fields of cosmetology, pharmacy, hygiene and foodstuff products, especially when there is a wish to improve preservation of the packaged product.

We claim:

1. A process for the production of a tube (45) fitted with a pump (1) for dispensing of a product, said pump (1) having an annular fixing rim (2), said process comprising the steps of:
    (a) retaining said pump (1) between at least a pair of opposed male mould die tools (10,21) to sealingly clamp said rim (2) and retain the pump (1) so as to limit heating thereof during a moulding operation;
    (b) positioning a tube body (190) or skirt blank (19) around a male die tool (9), the end of said body (190) or said skirt (19) projecting beyond said tool (9);
    (c) providing an assembly of a plurality of male die tools (9,10,21) and a plurality of female die tools (18,32,40) defining an annular space (24) within which is contained an outer portion of said annular rim (2) and the upper end of said body (190) or said skirt (19), which assembly includes a plurality of injection ducts (22) which open into said annular space (24); and
    (d) introducing molten plastics material into said annular space (24) by way of said ducts (22), allowing the plastics material to cool and removing the resulting tube (45) from the mould.

2. A process according to claim 1 wherein said injection ducts (22) each open into said annular space (24) by way of an orifice corresponding to a duct diameter of 0.7 to 1.4 mm or of a cross-section of equivalent area.

3. A process according to claim 1 wherein the body (190) or the skirt blank (19) is disposed within a die (18) comprising a surface (31) in which is disposed the end of the body (190) or the skirt (19) which projects byond said tool (9).

4. A process according to any one of claims 1, 2 or 3 wherein, in step (d):
    molten plastics material is simultaneously injected by way of orifices (26) of said injection ducts (22) over a period of between 1.5 and 5 seconds;
    then the assembly is left to cool for a time which is at least equal to three times the injection time;
    then the moulded article is removed from the mould by relative displacement of the tools, the plastics material of the injection ducts (22) or 'cold sprues' (220) being extracted from the die and/or die tools (21), and the tube (45) is extracted; and
    the 'cold sprues' are then cut off.

5. A process according to any one of claims 1, 2 or 3 wherein the cavity (11) of the tool (10) which accommodates the lower part (3) of the pump (1) is surmounted by an upper peripheral edge (12) against which the annular rim (2) of said pump (1) bears when the pump is disposed in said cavity (11), said annular rim (2) then projecting by at least 0.8 mm beyond said peripheral edge (12), and said cavity (11) in its upper part (13) having a diametral clearance of at least 0.2 mm with respect to the pump (1) and comprising below same a portion (14) for centering of the pump (1), having a maximum diametral clearance of 0.2 mm with respect to said pump.

6. A process according to claim 5 wherein the peripheral support surface (27) with which the tool (21) accommodating the upper part of the pump (1) bears against the annular fixing rim (2) of said pump (1) is of a width of between 0.8 and 1.4 mm.

7. A process according to claim 5 wherein the peripheral fixing rim (2) of the pump (1) extends beyond said upper peripheral edge (12) of said tool (10) by from 1 to 3 mm.

8. A process according to claim 5 wherein the cavity (11) in said tool (10), in its upper part (13), has a clearance with respect to the pump (1) of at least 0.2 mm in respect of diameter over at least 5 mm in height, and that said centering portion (14) is at least 3 mm in height.

9. A process according to claim 6 wherein the upper tool (21) caps the upper part (6) of the pump (1) with a lateral clearance of at least 0.3 mm in respect of diameter.

10. A process according to any one of claims 1, 2 or 3 wherein said injection ducts (22) extend through the tool (21) retaining the pump (1) and open towards the top of the annular moulding space (24), said ducts (22) being inclined with respect to the vertical axis (Z) at an angle ($\theta$) of between 24° and 40°.

11. A process according to claim 10 wherein the injection ducts (22) are inclined with respect to the axis (Z) at from 24° to 27°, the top (250) of the cavity (25) of the die tool (21) bearing against the discharge tube (9) of the pump (1) so as to reduce the height of said core (21) and to facilitate removal of the moulded item from the mould.

12. A process according to claim 10 wherein the injection ducts (22) are between 2 and 5 in number, their common diameter being between 0.8 and 1.3 mm and their upper orifices (26) being disposed within a circle of a diameter of 7 mm, which is centered on the axis (Z).

13. A process according to any one of claims 1, 2 or 3 wherein injection ducts (221) extend through an upper tool (211) capping the pump (1) and open at the upper end of the annular moulding space (24), said ducts (221) being vertical.

14. A process according to claim 1 wherein, above the die (18), the annular moulding space (24) comprises the contour of a peripheral groove (35) or a rib on the tube (45), said contour being provided by openable tools (32) provided with means for moving them apart.

15. A process according to claim 14 wherein the tube is removed from the mould by the following successive steps:
the tools (10 and 9) are lowered;
said tools (32) are opened, freeing the groove (35) or the rib;
the tools (18 and 32) and (40 and 21) are disengaged upwardly, the sprues (220) being removed from the mould and the tools (10 and 9) moving away from each other;
the tube (45) is released from the tools (10 and 9) by injecting air between the punch (9) and the tool (10) and said tube (45) is extracted upwardly.

* * * * *